United States Patent
Shi et al.

(10) Patent No.: US 12,057,146 B1
(45) Date of Patent: Aug. 6, 2024

(54) MAGNETIC RECORDING HEAD WITH AN SOT DEVICE COUPLED WITH SIDE SHIELD

(71) Applicant: Western Digital Technologies, Inc., San Jose, CA (US)

(72) Inventors: Shengjie Shi, San Jose, CA (US); Alexander Goncharov, Morgan Hill, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,109

(22) Filed: Jul. 19, 2023

Related U.S. Application Data

(60) Provisional application No. 63/491,620, filed on Mar. 22, 2023.

(51) Int. Cl.
*G11B 5/31* (2006.01)
*G11B 5/00* (2006.01)

(52) U.S. Cl.
CPC ...... *G11B 5/312* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 5,492,720 A | 2/1996 | Gill et al. | |
| 6,313,973 B1 | 11/2001 | Fuke et al. | |
| 8,786,984 B2 * | 7/2014 | Das | G11B 5/315 360/110 |
| 9,076,463 B2 * | 7/2015 | Yamada | G11B 5/1278 |
| 9,830,966 B2 | 11/2017 | Mihajlovic et al. | |
| 10,157,632 B1 | 12/2018 | Song et al. | |
| 10,181,334 B1 * | 1/2019 | Song | G11B 5/1278 |
| 10,325,618 B1 * | 6/2019 | Wu | G11B 5/1278 |
| 10,580,441 B1 | 3/2020 | Chen et al. | |
| 10,650,847 B2 * | 5/2020 | Li | G11B 5/374 |
| 10,789,976 B2 * | 9/2020 | Narita | G11B 5/3146 |

(Continued)

OTHER PUBLICATIONS

Atsufumi Hirohata et al. "Future Perspectives for Spintronic Devices", 2014 J. Phys. D: Appl. Phys. 47 193001.

*Primary Examiner* — William J Klimowicz
(74) *Attorney, Agent, or Firm* — PATTERSON + SHERIDAN, LLP

(57) ABSTRACT

The present disclosure generally relates to a magnetic recording head comprising a spintronic device. By electrically coupling the side shielding of the head (acting as current leads) to the spin Hall layer of the spintronic device, the current path length is optimally provided across the spin Hall layer as well as fitting within the space constraints of the overall head. In addition, by using an antiferromagnetic insulator as a spacer between the spin Hall layer and the magnetic spin torque layer of the spintronic device, electrically shunting into the magnetic spin torque layer is reduced, maximizing the spin torque and reducing loss of efficiency due to shunting. Thus, the magnetic recording head may utilize the energy assistance from the spintronic device without reducing the quality and reliability of the write head by running an undesirable current through critical components of the write head.

18 Claims, 8 Drawing Sheets

(56) References Cited

U.S. PATENT DOCUMENTS

| | | | |
|---|---|---|---|
| 10,867,626 B1* | 12/2020 | Li | G11B 5/1278 |
| 10,943,610 B2* | 3/2021 | Narita | G11B 5/315 |
| 11,056,136 B2 | 7/2021 | Chen | |
| 11,170,804 B2 | 11/2021 | Li et al. | |
| 11,205,446 B1* | 12/2021 | Li | G11B 5/02 |
| 11,636,874 B1* | 4/2023 | Tang | G11B 5/3146 |
| | | | 360/313 |
| 11,881,237 B1* | 1/2024 | Asif Bashir | G11B 5/1278 |
| 2015/0043106 A1* | 2/2015 | Yamada | G11B 5/1278 |
| | | | 360/123.05 |
| 2015/0092292 A1* | 4/2015 | Furukawa | G11B 33/1433 |
| | | | 360/59 |
| 2019/0355386 A1* | 11/2019 | Matsumoto | G11B 5/1278 |
| 2020/0411039 A1 | 12/2020 | Song et al. | |
| 2023/0125878 A1* | 4/2023 | Tang | G11B 5/11 |

* cited by examiner

MAGNETIC RECORDING HEAD WITH AN SOT DEVICE COUPLED WITH SIDE SHIELD

CROSS-REFERENCE TO RELATED APPLICATIONS

This application claims benefit of U.S. Provisional Patent Application Ser. No. 63/491,620, filed Mar. 22, 2023, which is herein incorporated by reference.

BACKGROUND OF THE DISCLOSURE

Field of the Disclosure

Embodiments of the present disclosure generally relate to a magnetic recording head comprising a spintronic device, such as a magnetic media drive.

Description of the Related Art

At the heart of a computer is a magnetic disk drive. Information is written to and read from a disk as the disk rotates past read and write heads that are positioned very closely to the magnetic surface of the disk. Microwave-assisted magnetic recording (MAMR) is a type of energy-assisted recording technology to improve the recording density of a magnetic recording medium. In MAMR, a spintronic device is located near the write element to produce a high-frequency AC field. The AC field reduces an effective coercivity of a magnetic recording medium, allowing writing at lower magnetic writing fields from the write pole. Due to the lower magnetic writing fields, higher recording density of the magnetic recording medium may be achieved through MAMR.

MAMR designs can suffer from significant current shunting, which will degrade performance of the write head. The current running through the spintronic device leaks through the spintronic device rather than flowing in the intended direction. By losing current flow in the intended direction, the total effectiveness of the spintronic device decreases.

Therefore, there is a need in the art for write heads that reduce and/or eliminate current shunting.

SUMMARY OF THE DISCLOSURE

The present disclosure generally relates to a magnetic recording head comprising a spintronic device. By electrically coupling the side shielding of the head (acting as current leads) to the spin Hall layer of the spintronic device, the current path length is optimally provided across the spin Hall layer as well as fitting within the space constraints of the overall head. In addition, by using an antiferromagnetic insulator as a spacer between the spin Hall layer and the magnetic spin torque layer of the spintronic device, electrically shunting into the magnetic spin torque layer is reduced, maximizing the spin torque and reducing loss of efficiency due to shunting. Thus, the magnetic recording head may utilize the energy assistance from the spintronic device without reducing the quality and reliability of the write head by running an undesirable current through critical components of the write head.

In one embodiment, a magnetic recording head comprises: a main pole; a trailing shield; one or more side shields disposed adjacent to the main pole, at least one of the one or more side shields comprises a lead; and a spintronic device disposed between the main pole and the trailing shield the spintronic device comprising: a spin Hall layer (SHL) is electrically coupled with the one or more side shields; a spin torque layer (STL); and a spacer layer disposed between the SHL and STL.

In another embodiment, a magnetic recording head, comprises: a main pole; a trailing shield; two or more side shields disposed adjacent to the main pole; and a spintronic device disposed between the main pole and the trailing shield, wherein the one or more side shields and spintronic device are arranged to create a current path from the two or more side shields through the spintronic device to another of the two of more side shields.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising a spintronic device. By electrically coupling the side shielding of the head (acting as current leads) to the spin Hall layer of the spintronic device, the current path length is optimally provided across the spin Hall layer as well as fitting within the space constraints of the overall head. In addition, by using an antiferromagnetic insulator as a spacer between the spin Hall layer and the magnetic spin torque layer of the spintronic device, electrically shunting into the magnetic spin torque layer is reduced, maximizing the spin torque and reducing loss of efficiency due to shunting. Thus, the magnetic recording head may utilize the energy assistance from the spintronic device without reducing the quality and reliability of the write head by running an undesirable current through critical components of the write head.

Figure 1:
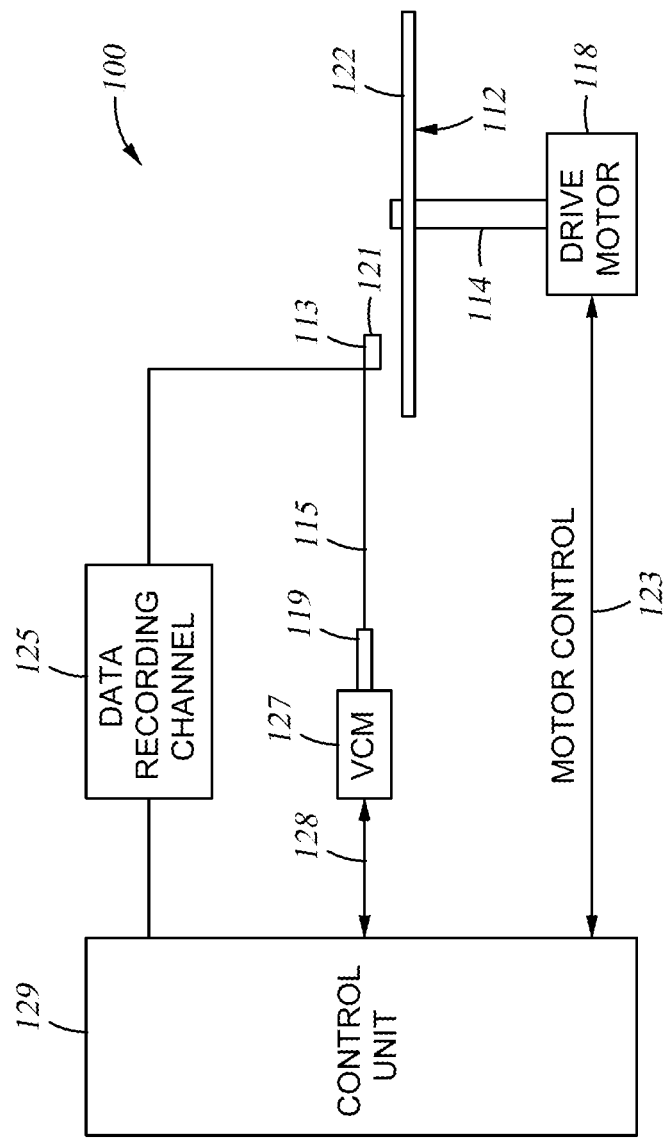
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
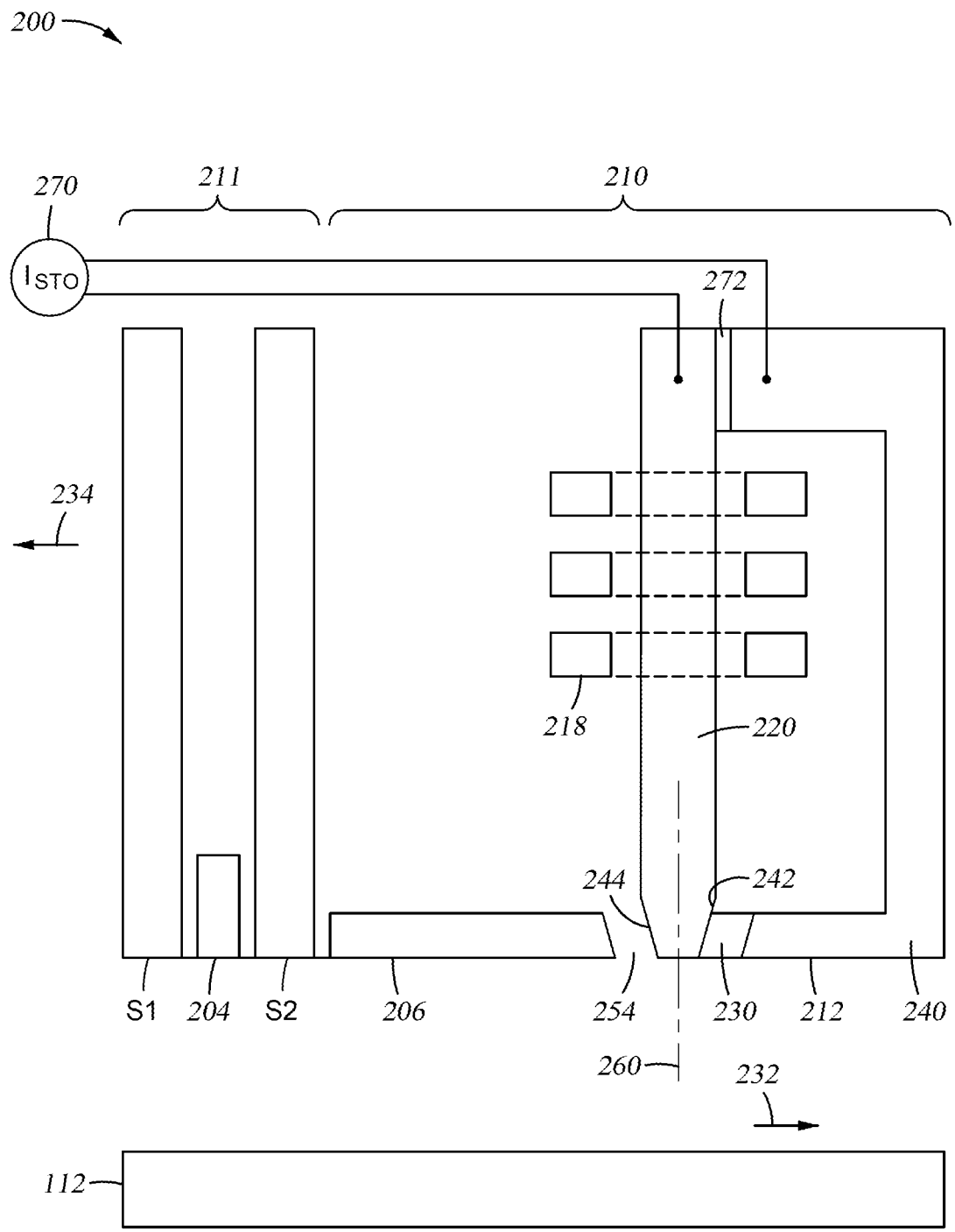
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole (MP) 220, a leading shield 206, a trailing shield (TS) 240, and a spintronic device 230 disposed between the main pole 220 and the TS 240. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and operates as a spin orbit torque (SOT) based device that enhances the magnetic recording of the write head 210, through two primary effects.

In the first effect, in various embodiments the SOT based spintronic device 230 enhances the write field from the main pole. In operation, an electron current applied to a spin Hall layer of the spintronic device 230 induces a spin current that switches the magnetization of a magnetic spin torque layer (STL) against a gap field, which enhances the recording field from the main pole to the media. This will be further illustrated below in conjunction with FIG. 3E.

In the second effect, in some embodiments the SOT based spintronic device 230 operates under the principles of MAMR and generates an oscillation in the STL layer that reduces the coercive force of the magnetic recording medium. The electron current may include direct current (DC) waveforms, pulsed DC waveforms, and/or pulsed current waveforms going to positive and negative voltages, or other suitable waveforms. In some embodiments, an electron current is applied to the SHL of the spintronic device 230 from a current source 270, inducing an oscillation in the STL to produce a high frequency alternating current (AC) field to the media. This will be further illustrated below in conjunction with FIG. 3F.

Figure 3A:
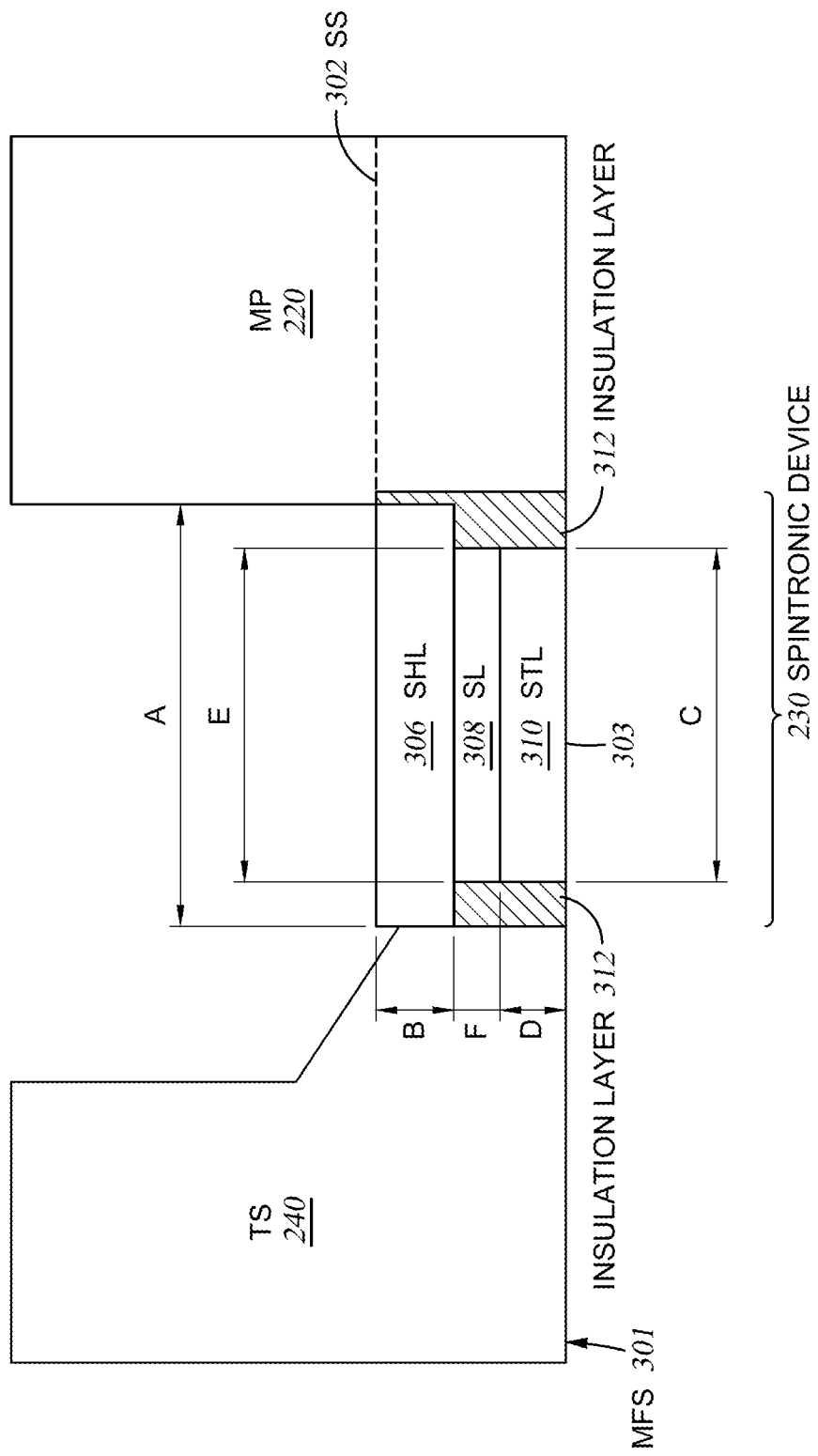
FIG. 3A is a cross-sectional view of the magnetic writing head, according to one embodiment.
Figure 3B:
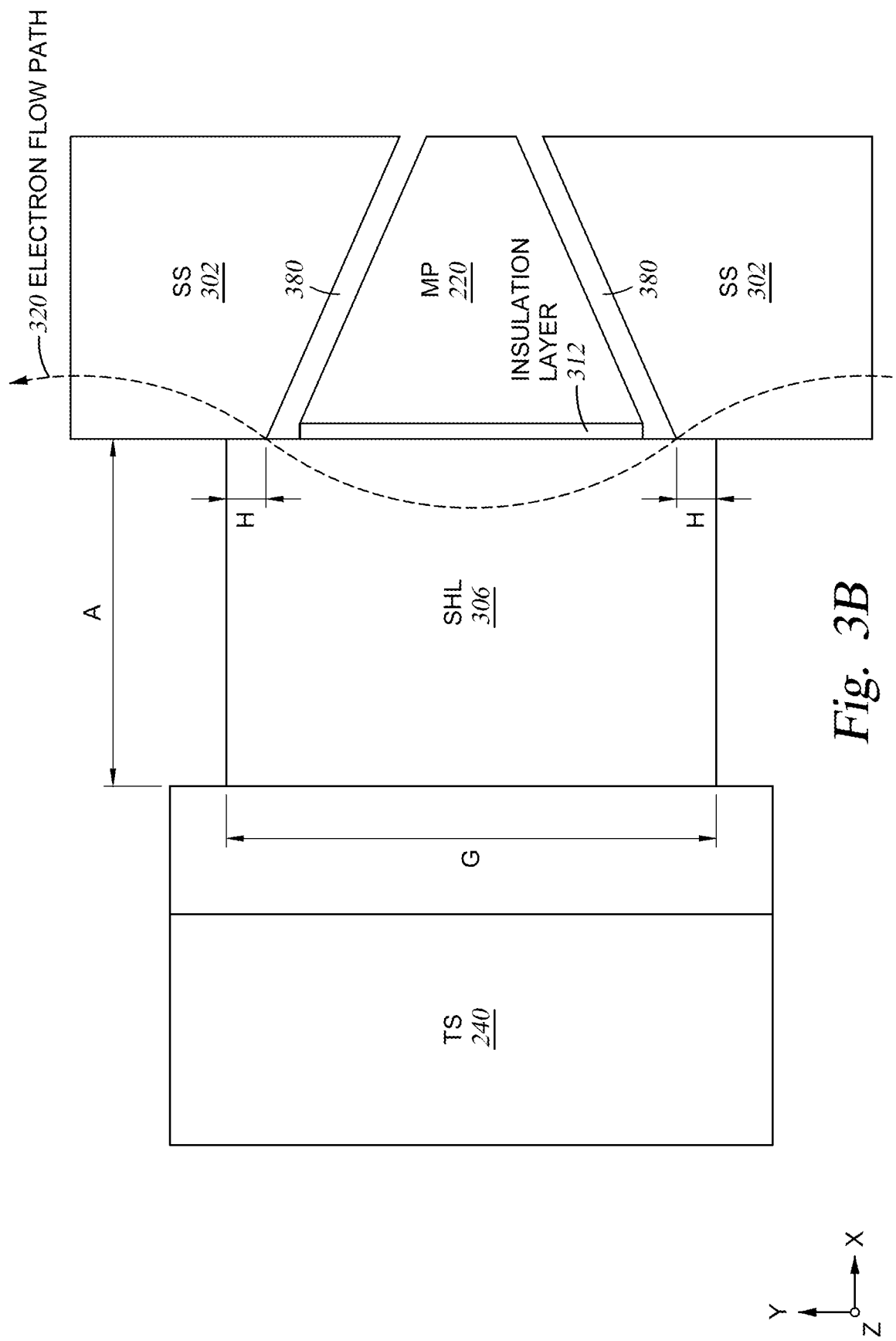
FIG. 3B is a top view of the magnetic writing head, according to one embodiment.
Figure 3C:
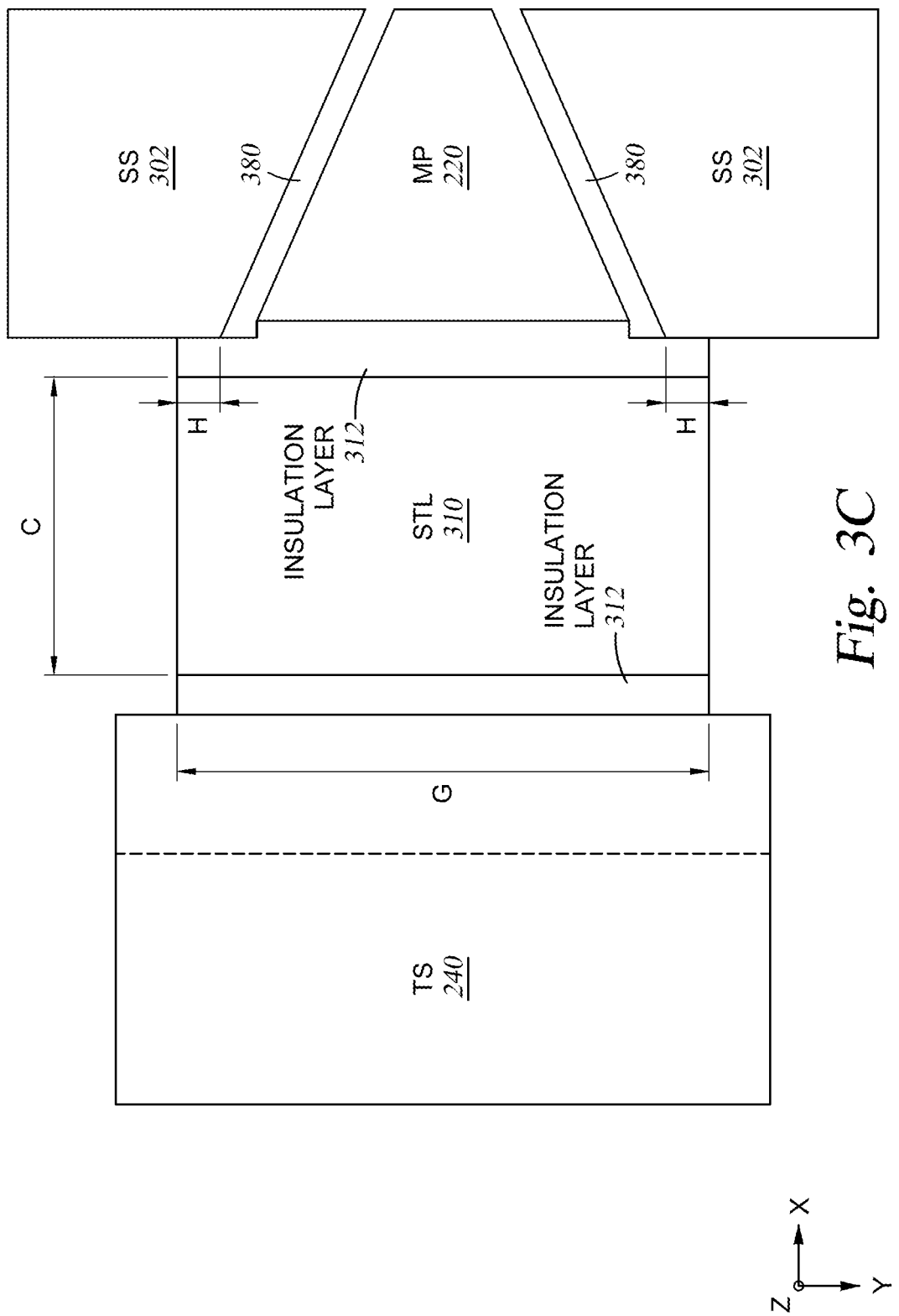
FIG. 3C is a media facing surface (MFS) view of the magnetic writing head, according to one embodiment.
Figure 3D:
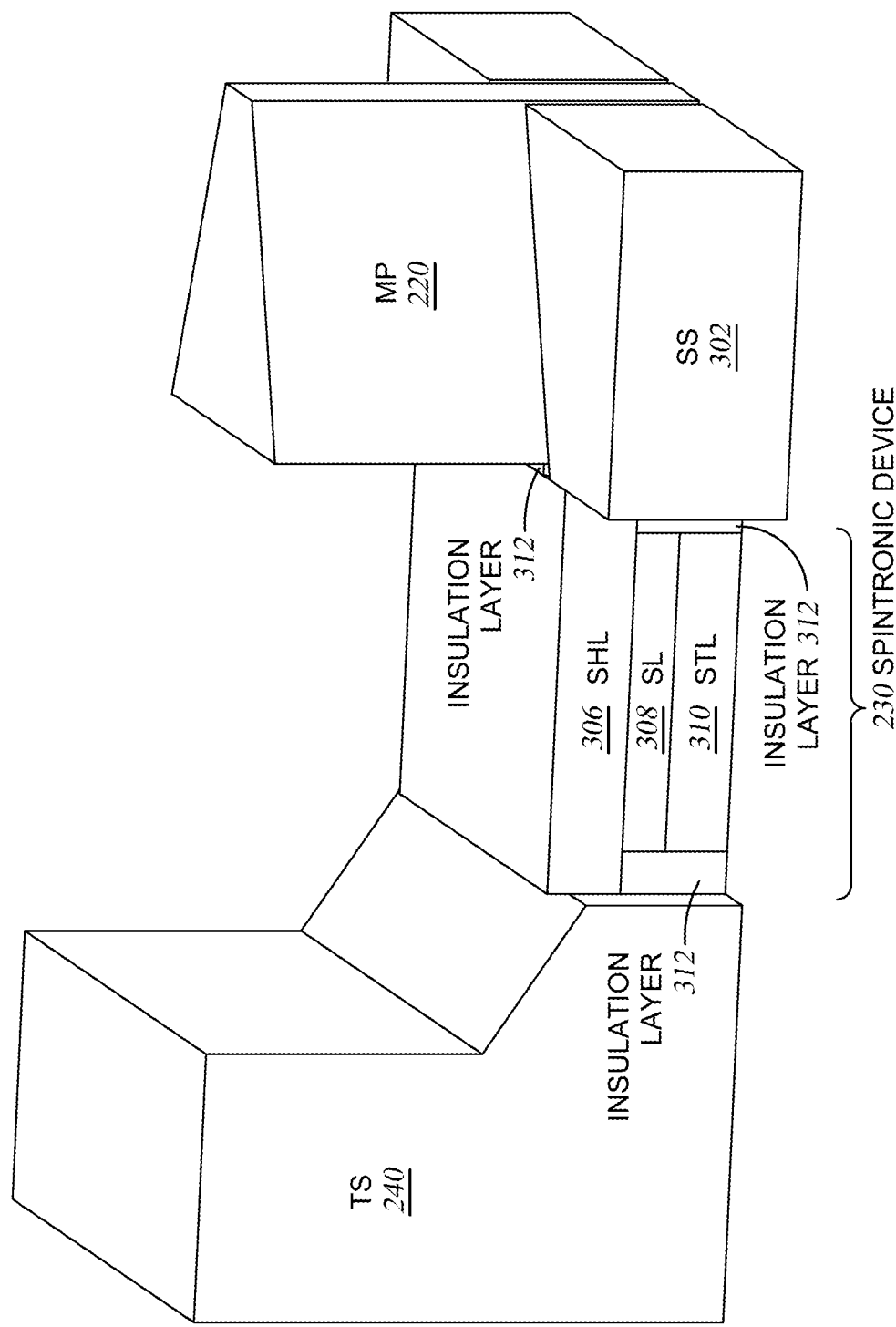
FIG. 3D is an isometric view of the magnetic writing head, according to one embodiment.

FIG. 3A is a cross-sectional view of the magnetic writing head, according to one embodiment. FIG. 3B is a top view of the magnetic writing head, according to one embodiment. FIG. 3C is a media facing surface (MFS) view of the magnetic writing head, according to one embodiment. FIG. 3D is an isometric view of the magnetic writing head, according to one embodiment. The figures show in more details the various embodiments of the spintronic device 230 within the overall magnetic writing head.

As shown in FIG. 3A, the TS 240 extends down to the MFS 301 and begins to extend closer to the spintronic device 230 as the TS 240 reaches the MFS 301. The spintronic device 230 includes a spin Hall layer (SHL) 306, a spin torque layer (STL) 310, and a spacer layer 308 sandwiched between the STL 310 and SHL 306. As shown in FIG. 3A, the STL 310 has a surface 303 at the MFS 301 while both the spacer layer 308 and SHL 306 are recessed from the MFS 301. Additionally, the SHL 306, STL 310 and spacer layer 308 extend between the TS 240 and MP 220 as shown in FIG. 3A. In the following dimensions, a length refers to the down track direction of recording, a width refers to a cross track direction, and a depth refers to the perpendicular direction from the MFS. The SHL 306 has a length A between the TS 240 and MP 220 of between about 30 and about 100 nm, a width G (FIG. 3B) of between about 200 and about 500 nm, and a depth B extending in a direction away from the MFS 301 of between about 5 and about 15 nm. Similarly, the STL 310 has a length C between the TS 240 and MP 220 of between about 15 and about 30 nm, the width G, and a depth D extending in a direction away from the MFS 301 of between about 10 and about 30 nm. Finally, the spacer layer 308 has a length E between the TS 240 and MP 220 of between about 15 and about 30 nm, the width G, and a depth F extending in a direction away from the MFS 301 of between about 5 and about 15 nm. The length C of the STL 310 is less than the length A of the SHL 306.

As shown in FIG. 3A, the SHL 306 is in contact with the TS 240 and spaced from the MP 220 by an insulating layer 312. It is to be understood that it is contemplated that one or more electrical insulation layers 312 may be disposed between the TS 240 and the SHL 306. Additionally, the insulating layer 312 is shown to be disposed between the spacer layer 308 and the MP 220, the spacer layer 308 and the TS 240, the STL 310 and the MP 220, and the STL 310 and the TS 240.

The electrical insulation layers 312 may comprise electrically insulating material such as magnesium oxide, alumina, as well as other oxides, nitrides, and/or oxynitrides. The STL 310 may comprise NiFe, CoFe, CoFeNi, CoMnGe, NiCo, NiFeCu, CoFeMnGe, CoMnSi, CoFeSi, and/or other soft or hard ferromagnetic materials, other Heusler alloys, other suitable magnetic layers, and/or multiple layers thereof. The spacer layer 308 is an antiferromagnetic layer to electrically insulate the STL 310 from the SHL 306 to prevent electrical shunting without interfering with the spin current injection to the STL 310. The spacer layer 308 may comprise NiO, YIG, MgO, or other materials with similar antiferromagnetic effects. The SHL 306 may comprise a heavy metal, such as beta phase Tantalum ($\beta$-Ta), beta phase tungsten ($\beta$-W), platinum (Pt), hafnium (Hf), a heavy metal alloy of tungsten with hafnium, iridium, or bismuth doped copper, a topological insulator such as a (Bi,Sb)Te or BiSb, or antiferromagnetic materials such as MnIr, XMn (X=Fe, Pd, Ir, or Pt) or Cu—Au—I type antiferromagnets.

While the spintronic device 230 is electrically insulated from the MP 220, the spintronic device is electrically coupled to the side shields 302 as shown in FIG. 3B. In particular, the SHL 306 is electrically coupled to and in contact with the SS 302, while both the spacer layer 308 and STL 310 are spaced from the SS 302 by the insulating layer 312. It is noted that direct contact between SHL and SS is not necessarily required as long as the two are electrically coupled. The SS 302 act as electrical leads and provide a current path across the SHL 306.

In some embodiments, the SHL 306 is coupled to the SS 302 over a distance H of between about 50 and about 300 nm. The larger the contact area, the larger the area through which current may pass and hence ensure the current will travel from the SS 302 through the SHL 306 and to the other SS 302. Current will travel the path of least resistance, and desirably, the path of least resistance is through the SS 302, SHL 306, and other SS 302. Thus, increasing the contact area, distance H, is beneficial. However, the contact area is limited by the amount of space available (generally speaking head dimension should be minimized to support high density recording). Additionally, the material resistivity may impact the current path. The lower the electrical resistivity, the more the material allows electric current to pass. Hence, in terms of materials, it is desirable for the SS 302 and the SHL 306 materials to have a lower resistivity then materials in contact with the SS 302 and SHL 306 so that the lowest electrical resistivity path will be through the SS 302 and SHL 306. The SS 302 is electrically insulated from the MP 220 by electrically insulating material 380 (See FIG. 3B), which along with the insulation 312 between MP and SHL, defines the current path from one SS to another. The SS 302 is disposed adjacent on either side of the MP 220 in the z-axis but are not in contact with the MP 220. The SS 302 extends from the ABS to the top of the SHL 306. The electrical coupling of the SHL through the SS, rather than through the MP, ensures the current flows across the full width SHL to achieve the maximum SOT effect possible. If the current were applied through the MP rather than the SS, the SOT effect would be minimized as the current would not travel the width of the SHL, leading to a reduced SOT effect to the STL.

Figure 3E:
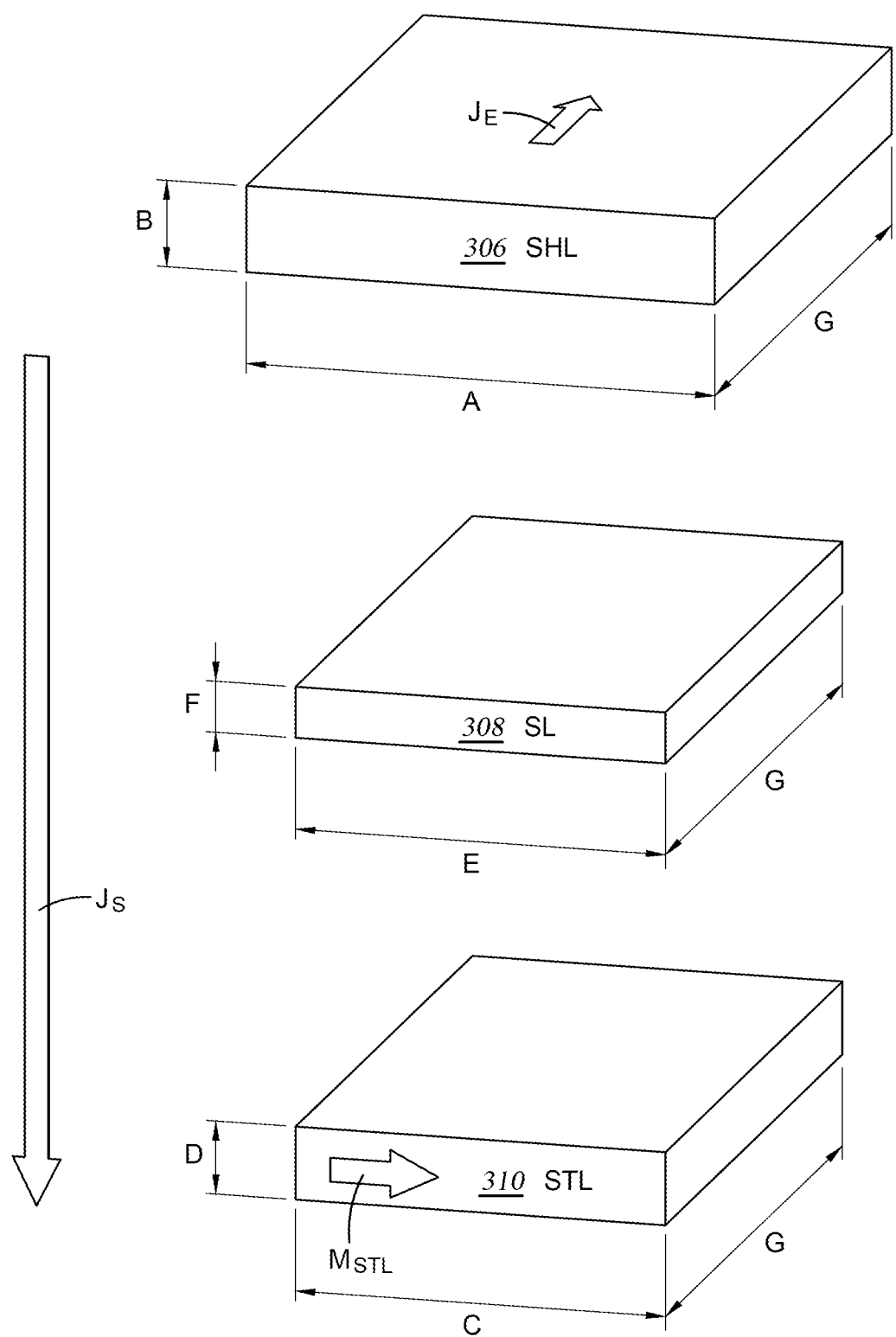
FIG. 3E is an exploded view of the spintronic device, according to one embodiment.
Figure 3F:
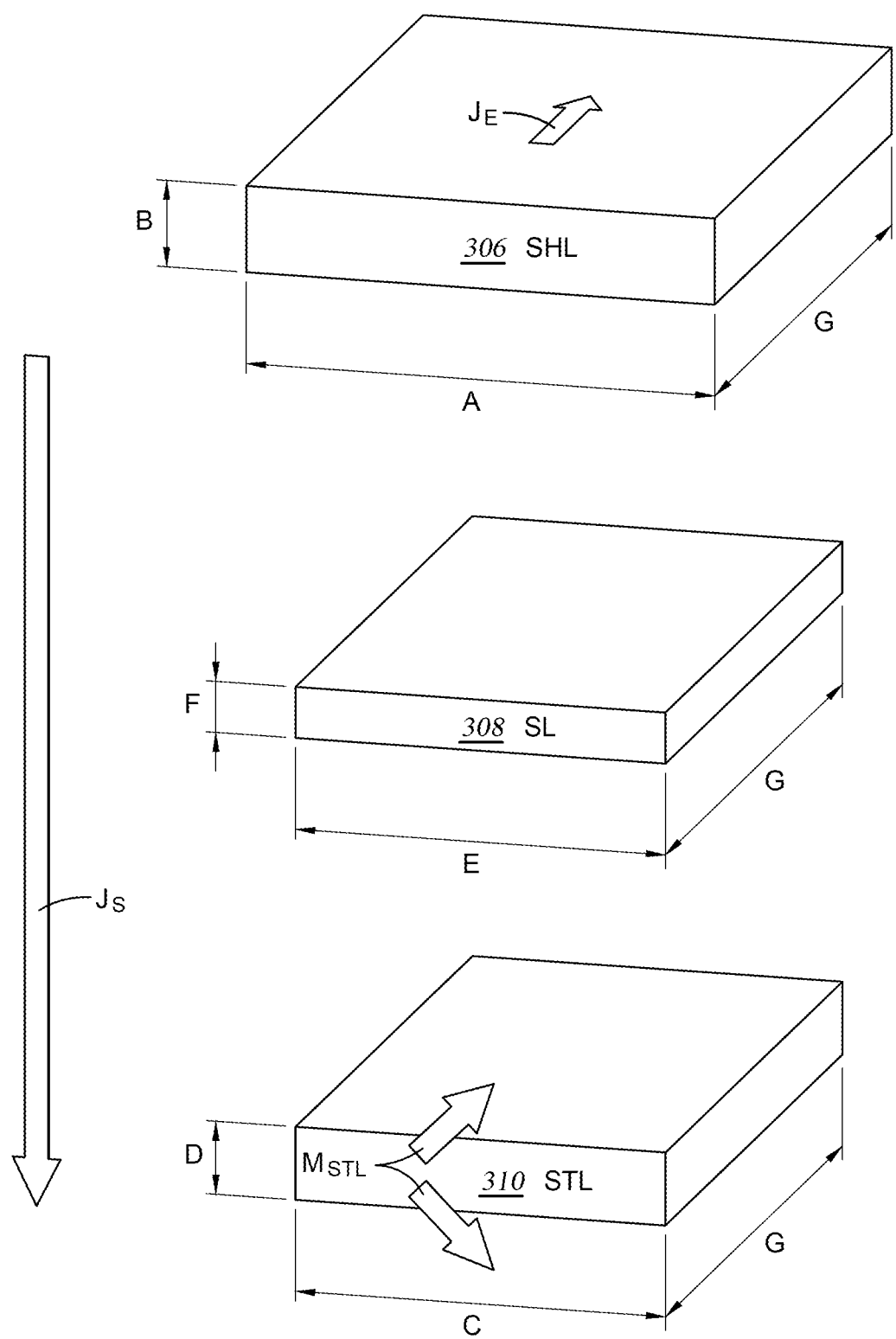
FIG. 3F is an exploded view of the spintronic device, according to another embodiment.

FIG. 3B is a top view of the recording head while FIG. 3C is an MFS view of the same. FIG. 3B illustrates the electron flow path 320 of the applied current from the SS 302 to the SHL 306. The path of the electric current runs along the y-axis with the SS 302 acting as current leads. When the SHL 306 receives current from one of the SS 302, the SHL 306 induces spin in the STL 310 as part of the SOT effect. The induced spin of the STL 310 creates a torque in the x-axis towards the MP 220 or oscillation, as illustrated in FIGS. 3E and 3F respectively, to assist the writing process. In prior designs where an SHL is next to the magnetic STL, electrical shunting into the magnetic STL can occur, increasing the current injected into the SHL that is necessary to achieve the SOT effect. In some embodiments, an effective spacer layer that is thin, with high resistivity and long diffusion length, is placed between the SHL and STL can eliminate electrical shunting, which effectively improves the spin generated by the SHL 306 without having to apply as high a current. By picking a material for the spacer layer 308 that is antiferromagnetic, due to the antiferromagnetic insulator effect, the spacer layer can thus provide electrical insulation, ensuring the maximum amount of spin can reach the STL 310.

The arrangements and shapes of the layers and features of the head are further illustrated in the isometric view of FIG. 3D.

FIG. 3E is an exploded view of the spintronic device 230, according to one embodiment, and illustrates the against gap field effect (the first of the two aforementioned effects of the spintronic device) to enhance writing. The spintronic device 230 functions when receiving a current through the SHL 306. The current may be applied at a predetermined level to induce a consistent spin to the STL 310. The predetermined level may be between about 300 mA/cm$^2$ and about 1000 mA/cm$^2$. It is to be understood that the material property of the SHL 306 impacts the predetermined level and hence, with changing material comes a change within the range for the predetermined level. The current running through the SHL 306 in the y direction generates a spin orbit torque (SOT) in the z direction that transfers to the STL 310. This causes the magnetization of the STL 310 to align the x-axis against the gap field (toward the main pole) to improve the effective field experienced by the media from the main pole which allows for finer granularity when writing.

FIG. 3F is an exploded view of the spintronic device 230, according to another embodiment, and illustrates the oscillation based MAMR effect (the second of the two aforementioned effects of the spintronic device) to enhance writing. In contrast to FIG. 3E, the spin torque applied to the STL causes it to magnetically oscillate in FIG. 3F. The spintronic device 230 may serve a different function when receiving a lesser current through the SHL 306 than depicted in FIG. 3E. When a current is applied to the SHL 306 at a second lower predetermined level, the SHL 306 induces an oscillation in the STL 310. The second lower predetermined level may be between about 200 mA/cm$^2$ and about 500 mA/cm$^2$. It is to be understood that the SHL 306 impacts the second lower predetermined level and hence, with changing material comes a change within the range for the second lower predetermined level. The current running through the SHL 306 in the y direction generates a SOT that transfers to the STL 310. This oscillation of the STL causes the media to resonate at the same frequency to lower the media's coercivity to assist in writing per the MAMR effect.

In summary, the thin spacer layer, which may be an antiferromagnetic insulating layer, enhances the performance of SOT driven spintronic devices when placed between a SHL and STL. The spacer layer prevents electric current shunting into the magnetic STL but allows spin current transport with no loss or even with enhancement of transport. Thus the spacer layer significantly boosts the effectiveness of the achievable SOT effect per the input current applied. Relatedly, the electrical coupling of the SHL through the SS, rather than through the MP, ensures the current flows across the full width SHL to achieve the maximum SOT effect possible. If the current were applied through the MP rather than the SS, the SOT effect would be minimized as the current would not travel the width of the SHL, leading to a reduced SOT effect to the STL.

In one embodiment, a magnetic recording head comprises: a main pole; a trailing shield; one or more side shields disposed adjacent to the main pole, at least one of the one or more side shields comprises a lead; and a spintronic device disposed between the main pole and the trailing shield the spintronic device comprising: a spin Hall layer (SHL) is electrically coupled with the one or more side shields; a spin torque layer (STL); and a spacer layer disposed between the SHL and STL. The magnetic recording head further comprises an electrically insulating material disposed between the spintronic device and the main pole. The SHL comprises platinum or beta-tungsten. The spacer layer comprises antiferromagnetic material. The antiferromagnetic material comprises nickel oxide. The STL comprises NiFe, CoFe, CoFeNi, CoMnGe, NiCo, NiFeCu, CoFeMnGe, CoMnSi, CoFeSi, or Heusler alloys. The magnetic recording head further comprises an electrically insulating material disposed between the one or more side shields and the main pole. The SHL is in contact with the trailing shield. The STL is spaced from the main pole and the trailing shield by an insulating layer. The spacer layer is spaced from the main pole and the trailing shield by the insulating layer. A magnetic recording device comprising the magnetic recording head is also contemplated.

In another embodiment, a magnetic recording head, comprises: a main pole; a trailing shield; two or more side shields disposed adjacent to the main pole; and a spintronic device disposed between the main pole and the trailing shield, wherein the one or more side shields and spintronic device are arranged to create a current path from the two or more side shields through the spintronic device to another of the two of more side shields. The spintronic device comprises: a spin torque layer (STL) having a first length in a down track direction and a first width in a cross track direction; a spacer layer disposed on the STL and having a second length in the down track direction and a second width in the cross track direction; and a spin Hall layer (SHL) disposed on the spacer layer and having a third length in the down track direction and a third width in the cross track direction, wherein the third length is greater than the first length and the second length. The first width, the second width, and the third width are substantially equal. The first length and the second length are substantially equal. The STL is disposed at a media facing surface (MFS). The SHL is recessed from the MFS. A magnetic recording device comprising the magnetic recording head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole;
a trailing shield;
one or more side shields disposed adjacent to the main pole, at least one of the one or more side shields comprises a lead; and
a spintronic device disposed between the main pole and the trailing, the spintronic device comprising:
a spin Hall layer (SHL) is electrically coupled with the one or more side shields;
a spin torque layer (STL); and
a spacer layer disposed between the SHL and STL.

2. The magnetic recording head of claim 1, further comprising an electrically insulating material disposed between the spintronic device and the main pole.

3. The magnetic recording head of claim 2, wherein the SHL comprises platinum or beta-tungsten.

4. The magnetic recording head of claim 2, wherein the spacer layer comprises antiferromagnetic material.

5. The magnetic recording head of claim 4, wherein the antiferromagnetic material comprises nickel oxide.

6. The magnetic recording head of claim 2, wherein the STL comprises NiFe, CoFe, CoFeNi, CoMnGe, NiCo, NiFeCu, CoFeMnGe, CoMnSi, CoFeSi, or Heusler alloys.

7. The magnetic recording head of claim 1, further comprising an electrically insulating material disposed between the one or more side shields and the main pole.

8. The magnetic recording head of claim 1, wherein the SHL is in contact with the trailing shield.

9. The magnetic recording head of claim 1, wherein the STL is spaced from the main pole and the trailing shield by an insulating layer.

10. The magnetic recording head of claim 9, wherein the spacer layer is spaced from the main pole and the trailing shield by the insulating layer.

11. A magnetic recording device comprising the magnetic recording head of claim 1.

12. A magnetic recording head, comprising:
a main pole;
a trailing shield;
two or more side shields disposed adjacent to the main pole; and
a spintronic device disposed between the main pole and the trailing shield, wherein the two or more side shields and spintronic device are arranged to create a current path from one of the two or more side shields through the spintronic device to another of the two of more side shields.

13. The magnetic recording head of claim 12, wherein the spintronic device comprises:
a spin torque layer (STL) having a first length in a down track direction and a first width in a cross track direction;
a spacer layer disposed on the STL and having a second length in the down track direction and a second width in the cross track direction; and
a spin Hall layer (SHL) disposed on the spacer layer and having a third length in the down track direction and a third width in the cross track direction, wherein the third length is greater than the first length and the second length.

14. The magnetic recording head of claim 13, wherein the first width, the second width, and the third width are substantially equal.

15. The magnetic recording head of claim 13, wherein the first length and the second length are substantially equal.

16. The magnetic recording head of claim 13, wherein the STL is disposed at a media facing surface (MFS).

17. The magnetic recording head of claim 16, wherein the SHL is recessed from the MFS.

18. A magnetic recording device comprising the magnetic recording head of claim 12.

* * * * *